US012777135B2

(12) United States Patent
Chae et al.

(10) Patent No.: US 12,777,135 B2
(45) Date of Patent: Oct. 27, 2026

(54) ELECTRONIC APPARATUS AND CONTROL METHOD THEREOF

(71) Applicant: SAMSUNG ELECTRONICS CO., LTD., Suwon-si (KR)

(72) Inventors: Sungho Chae, Suwon-si (KR); Eunseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 287 days.

(21) Appl. No.: 18/583,356

(22) Filed: Feb. 21, 2024

(65) Prior Publication Data

US 2024/0195946 A1 Jun. 13, 2024

Related U.S. Application Data

(63) Continuation of application No. PCT/KR2022/012564, filed on Aug. 23, 2022.

(30) Foreign Application Priority Data

Oct. 18, 2021 (KR) ........................ 10-2021-0138236

(51) Int. Cl.
*G03B 21/14* (2006.01)
*H04N 9/31* (2006.01)

(52) U.S. Cl.
CPC ......... *H04N 9/3185* (2013.01); *H04N 9/3194* (2013.01)

(58) Field of Classification Search
CPC .. H04N 9/3185; H04N 9/3179; G03B 21/147; G03B 21/14
See application file for complete search history.

(56) References Cited

U.S. PATENT DOCUMENTS 9,075,295 B2 7/2015 Tsuji et al.
9,607,363 B2 3/2017 Tsuji
(Continued)

FOREIGN PATENT DOCUMENTS

CN 110381302 A 10/2019
CN 107454372 B 5/2021
(Continued)

OTHER PUBLICATIONS

International Search Report, PCT/ISA/210, dated Dec. 19, 2022, in International Application PCT/KR2022/012564.
(Continued)

*Primary Examiner* — Ryan D Howard
(74) *Attorney, Agent, or Firm* — STAAS & HALSEY LLP

(57) ABSTRACT

An electronic apparatus is disclosed. The electronic apparatus comprises: an acceleration sensor; a distance sensor; an image projector; and at least one processor connected to the acceleration sensor, the distance sensor, and the image projector to control the electronic apparatus, wherein the processor controls the image projector to project an image onto a projection surface, acquires vertical distortion information corresponding to a projected image on the basis of slope information of the electronic apparatus acquired by the acceleration sensor and distance information to the projection surface acquired by the distance sensor, acquires vertical keystone correction information on the basis of the vertical distortion information, when a first user command for keystone correction is received, performs keystone correction for the image on the basis of vertical keystone correction information corresponding to the first user command and the acquired vertical keystone correction information, and controls the image projector to project a keystone-corrected image.

13 Claims, 12 Drawing Sheets

(56) References Cited

U.S. PATENT DOCUMENTS

| | | | | |
|---|---|---|---|---|
| 10,754,237 | B2 | 8/2020 | Kurota | |
| 11,336,878 | B2 | 5/2022 | Yoon et al. | |
| 2005/0046804 | A1* | 3/2005 | Akutsu | H04N 9/3194 353/70 |
| 2008/0117387 | A1* | 5/2008 | Hamano | G03B 21/2033 353/121 |
| 2011/0069234 | A1 | 3/2011 | Kaise et al. | |
| 2011/0069235 | A1* | 3/2011 | Fujisaki | H04N 9/3185 348/E5.078 |
| 2011/0242421 | A1 | 10/2011 | Park et al. | |
| 2013/0169889 | A1 | 7/2013 | Kubota | |
| 2020/0344453 | A1 | 10/2020 | Yagi et al. | |
| 2022/0132071 | A1 | 4/2022 | Tanaka et al. | |

FOREIGN PATENT DOCUMENTS

| | | |
|---|---|---|
| JP | 2005-159828 | 6/2005 |
| JP | 2007-6093 | 1/2007 |
| JP | 2008-193280 | 8/2008 |
| JP | 2012-160930 | 8/2012 |
| JP | 2013-98837 | 5/2013 |
| JP | 2015-119419 | 6/2015 |
| JP | 2019-207392 | 12/2019 |
| JP | 2020-120236 | 8/2020 |
| KR | 10-0643406 | 11/2006 |
| KR | 10-2011-0110619 | 10/2011 |
| KR | 10-1295240 | 8/2013 |
| KR | 10-2124475 | 6/2020 |
| KR | 10-2021-0123059 | 10/2021 |

OTHER PUBLICATIONS

European Search Report dated Oct. 8, 2024, in European Application No. EP 22 88 3748.

Office Action dated Jan. 30, 2026, in Korean Application No. 10-2021-0138236.

* cited by examiner

ELECTRONIC APPARATUS AND CONTROL METHOD THEREOF

CROSS-REFERENCE TO RELATED APPLICATION(S)

This application is a bypass continuation of International Application No. PCT/KR2022/012564, filed on Aug. 23, 2022, which is based on and claims priority to Korean Patent Application No. 10-2021-0138236, filed on Oct. 18, 2021, in the Korean Intellectual Property Office, the disclosures of which are incorporated by reference herein in their entireties.

BACKGROUND

1. Field

The disclosure relates to an electronic apparatus and a control method thereof, and more particularly, to an electronic apparatus that projects an image, and a control method thereof.

2. Description of Related Art

Recently, as electronic technologies and optical technologies have developed, various projectors are being utilized. A projector means an electronic apparatus that projects light onto a projection surface, and makes an image displayed on the projection surface.

In the case of projecting an image by using a projector, in case the projector is placed upright on a flat space in the direction of the projection surface, an image of a rectangular form is displayed on the projection surface. In other cases, distortion in an up-down direction or a left-right direction may occur, or an image in a rotated state is displayed on the projection surface. Such distortion is referred to as a keystone effect.

For correcting a keystone effect, it is necessary for a user to manipulate the screen until distortion disappears by changing the screen little by little by utilizing a remote control or a projector button, etc. The user performs a keystone correction by using a user interface (UI), and in general, the user uses a four-direction (up, down, left, right) keystone correction UI (referred to as a four-direction UI hereinafter), and a corner keystone correction UI (referred to as a corner UI hereinafter) moving each vertex of an image.

In this case, a four-direction UI is easy to manipulate from a user's viewpoint compared to a corner UI, but there is a problem that, in case image distortion occurred simultaneously in a vertical direction and a horizontal direction, it is difficult to make the projected image into a rectangular form. Meanwhile, a corner UI has higher accuracy of a correction result than a four-direction UI, but there is a problem that the required number of times of manipulation is high, and thus the user's convenience is deteriorated.

SUMMARY

An electronic apparatus according to an embodiment for achieving the aforementioned purpose includes an acceleration sensor, a distance sensor, an image projector, and at least one processor configured to control the image projector to project an image onto a projection surface to provide a projection image on the projection surface, acquire distortion information in a vertical direction corresponding to the projection image based on slope information of the electronic apparatus acquired by the acceleration sensor and distance information to the projection surface acquired by the distance sensor, acquire keystone correction information in the vertical direction based on the distortion information in the vertical direction, based on receiving a first user instruction for a keystone correction, perform a keystone correction for the image to provide a keystone-corrected image based on keystone correction information in a horizontal direction corresponding to the first user instruction and the acquired keystone correction information in the vertical direction, and control the image projector to project the keystone-corrected image.

Also, the at least one processor may perform a first keystone correction for the image based on the keystone correction information in the vertical direction to provide a first keystone-corrected image, perform a second keystone correction for the first keystone-corrected image based on the keystone correction information in the horizontal direction corresponding to the first user instruction to provide a second keystone-corrected image, and control the image projector to project the second keystone-corrected image.

In addition, the keystone correction information in the horizontal direction corresponding to the first user instruction may comprise rotation information in one of a left direction or a right direction, and the at least one processor may acquire the second keystone-corrected image by performing a rotational correction for the first keystone-corrected image in any one of the left direction or the right direction with the vertical direction as an axis by a predetermined angle based on the keystone correction information in the horizontal direction.

Further, the at least one processor may, based on receiving a second user instruction for the keystone correction in the horizontal direction while the keystone-corrected image is being projected, perform a subsequent keystone correction for the keystone-corrected image based on the keystone correction information in the horizontal direction corresponding to the second user instruction to provide a subsequent keystone-corrected image, and control the image projector to project the subsequent keystone-corrected image.

Also, the at least one processor may predict a basic projection image of the image on the projection surface based on optical information of the electronic apparatus, acquire distortion information in a vertical direction for the basic projection image based on the slope information of the electronic apparatus and the distance information to the projection surface, and acquire the keystone correction information in the vertical direction based on the distortion information in the vertical direction for the basic projection image.

In addition, the at least one processor may control the image projector to project a UI comprising buttons in four directions of up, down, left, and right onto the projection surface, and based on receiving the first user instruction selecting one of a left direction button or a right direction button comprised in the UI, acquire the keystone correction information in the horizontal direction corresponding to the first user instruction.

Also, the electronic apparatus may further comprise a communication interface, and the at least one processor may, based on receiving a signal corresponding to the first user instruction selecting one of a left direction button or a right direction button among buttons in four directions provided on an external apparatus through the communication interface, acquire the keystone correction information in the horizontal direction corresponding to the first user instruction.

In addition, the at least one processor may identify a correction amount of the keystone correction in the horizontal direction based on a type of a user input corresponding to the first user instruction, and perform the keystone correction in the horizontal direction based on the identified correction amount.

Further, a control method of an electronic apparatus according to an embodiment may comprise the steps of projecting an image onto a projection surface to provide a projection image on the projection surface, acquiring distortion information in a vertical direction corresponding to the projection image based on slope information of the electronic apparatus acquired by an acceleration sensor and distance information to the projection surface acquired by a distance sensor, acquiring keystone correction information in the vertical direction based on the distortion information in the vertical direction, based on receiving a first user instruction for a keystone correction, performing a keystone correction for the image to provide a keystone-corrected image based on keystone correction information in a horizontal direction corresponding to the first user instruction and the acquired keystone correction information in the vertical direction, and projecting the keystone-corrected image.

Also, the step of performing the keystone correction for the image may comprise the steps of performing a first keystone correction for the image based on the keystone correction information in the vertical direction to provide a first keystone-corrected image, performing a second keystone correction for the first keystone-corrected image based on the keystone correction information in the horizontal direction corresponding to the first user instruction to provide a second keystone-corrected image, and projecting the second keystone-corrected image.

In addition, the keystone correction information in the horizontal direction corresponding to the first user instruction may comprise rotation information in one of a left direction or a right direction, and in the step of performing the second keystone correction, the second keystone-corrected image may be acquired by performing a rotational correction for the first keystone-corrected image in any one of the left direction or the right direction with the vertical direction as an axis by a predetermined angle based on the keystone correction information in the horizontal direction.

Further, the control method of an electronic apparatus according to an embodiment may comprise the steps of, based on receiving a second user instruction for the keystone correction in the horizontal direction while the keystone-corrected image is being projected, performing a subsequent keystone correction for the keystone-corrected image based on the keystone correction information in the horizontal direction corresponding to the second user instruction to provide a subsequent keystone-corrected image, and projecting the subsequent keystone-corrected image.

Also, the step of acquiring the distortion information in the vertical direction may comprise the steps of predicting a basic projection image of the image on the projection surface based on optical information of the electronic apparatus, and acquiring distortion information in a vertical direction for the basic projection image based on the slope information of the electronic apparatus and the distance information to the projection surface, and the step of acquiring the keystone correction information in the vertical direction may comprise the step of acquiring the keystone correction information in the vertical direction based on the distortion information in the vertical direction for the basic projection image.

In addition, in the step of projecting the image, a UI comprising buttons in four directions of up, down, left, and right may be projected onto the projection surface, and in the step of performing the keystone correction for the image, based on receiving the first user instruction selecting one of a left direction button or a right direction button comprised in the UI, the keystone correction information in the horizontal direction corresponding to the first user instruction may be acquired.

Further, in the step of performing the keystone correction for the image, based on receiving a signal corresponding to the first user instruction selecting one of a left direction button or a right direction button among buttons in four directions provided on an external apparatus through the communication interface, the keystone correction information in the horizontal direction corresponding to the first user instruction may be acquired.

Also, in the step of performing the keystone correction for the image, a correction amount of the keystone correction in the horizontal direction may be identified based on a type of a user input corresponding to the first user instruction, and the keystone correction in the horizontal direction may be performed based on the identified correction amount.

In a non-transitory computer readable recording medium storing computer instructions to cause an electronic apparatus to perform operations when the computer instructions are executed by a processor of the electronic apparatus, the operations may comprise the steps of projecting an image onto a projection surface to provide a projection image on the projection surface, acquiring distortion information in a vertical direction corresponding to the projection image based on slope information of the electronic apparatus acquired by an acceleration sensor and distance information to the projection surface acquired by a distance sensor, acquiring keystone correction information in the vertical direction based on the distortion information in the vertical direction, based on receiving a first user instruction for a keystone correction, performing a keystone correction for the image to provide a keystone-corrected image based on keystone correction information in a horizontal direction corresponding to the first user instruction and the acquired keystone correction information in the vertical direction, and projecting the keystone-corrected image.

DETAILED DESCRIPTION

Figure 1:
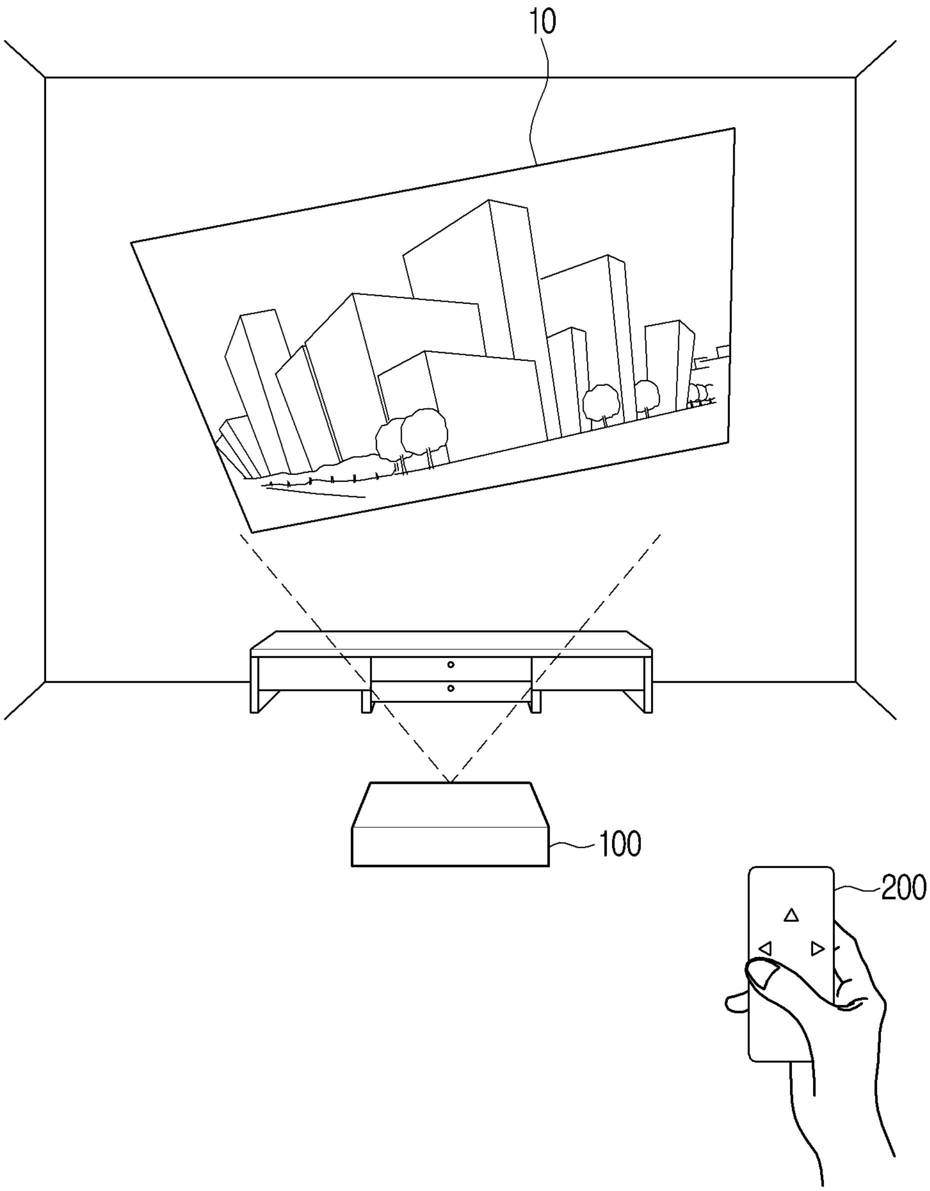
FIG. 1 is a diagram for illustrating a keystone correction method for promoting understanding.

Hereinafter, the disclosure will be described in detail with reference to the accompanying drawings.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in the disclosure, expressions such as "have," "may have," "include," and "may include" denote the existence of such characteristics (e.g.: elements such as numbers, functions, operations, and components, etc.), and do not exclude the existence of additional characteristics.

In addition, the expression "at least one of A and/or B" should be interpreted to mean any one of "A" or "B" or "A and B."

Further, the expressions "first," "second," and the like used in this specification may be used to describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Also, the expression "configured to" used in the disclosure may be interchangeably used with other expressions such as "suitable for," "having the capacity to," "designed to," "adapted to," "made to" and "capable of," depending on cases. Meanwhile, the term "configured to" may not necessarily mean that an apparatus is "specifically designed to" in terms of hardware.

In addition, singular expressions include plural expressions, unless defined obviously differently in the context. Also, in the disclosure, terms such as "include" or "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in the disclosure, "a module" or "a part" performs at least one function or operation, and may be implemented as hardware or software, or as a combination of hardware and software. In addition, a plurality of "modules" or "parts" may be integrated into at least one module and implemented as at least one processor (not shown), except "a module" or "a part" that needs to be implemented as specific hardware.

Hereinafter, one embodiment of the disclosure will be described in more detail with reference to the accompanying drawings.

FIG. 1 is a diagram for illustrating a keystone correction method for promoting understanding.

An electronic apparatus 100 equipped with a function of projecting an image, i.e., a projector function shows a screen in a relatively correct ratio when the projection direction of the electronic apparatus 100 constitutes a right angle with the projection surface, but projects a screen in a form that is distorted in an up-down direction, a left-right direction, or up-down-left-right directions in case the projection direction does not constitute a right angle with the projection surface. In this case, a keystone correction may be needed. Here, a keystone correction means a function of projecting a screen that is shown, i.e., a projected screen as if to move the corner portions of the screen forcibly and thereby adjusting the screen to be close to a quadrangle which is the original form.

According to an embodiment, a keystone correction may be performed by using a remote control 200 on which a four-direction UI is mounted, as illustrated in FIG. 1. A correction may be performed for a screen in a distorted form in an up-down direction and a screen in a distorted form in a left-right direction by using only a button in a vertical direction or a horizontal direction, but in case an image 10 in a distorted form in up-down-left-right directions is projected, a correction using only a button in any one direction is not sufficient, and a correction may be performed by using buttons in up-down-left-right directions. In this case, a user should perform a correction by considering all of the distortions in a vertical direction and a horizontal direction, and thus the accuracy of the correction result may be low, and even if an accurate correction is performed, it may take long for the correction. Meanwhile, in the case of a keystone correction using a corner UI, the accuracy of the correction result is higher than a four-direction UI, but the difficulty of manipulation is higher and the number of times of manipulation is far more than a four-direction UI, and thus there is a disadvantage that it also takes long for the correction.

Accordingly, hereinafter, various embodiments of performing an accurate keystone correction with a low number of times of manipulation by predicting a distortion in a vertical direction in advance, and performing a correction for a keystone distortion in a horizontal direction by reflecting this will be described.

Figure 2:
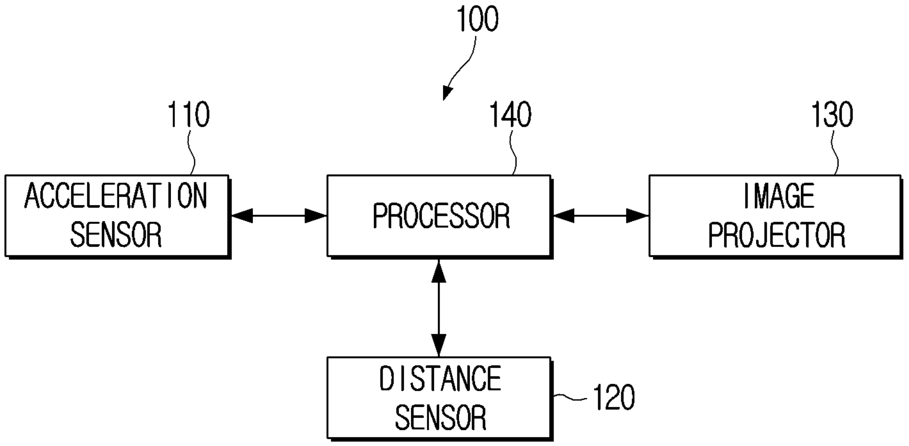
FIG. 2 is a block diagram illustrating a configuration of an electronic apparatus according to an embodiment.

FIG. 2 is a block diagram illustrating a configuration of an electronic apparatus according to an embodiment.

According to FIG. 2, the electronic apparatus 100 may include an acceleration sensor 110, a distance sensor 120, an image projector 130, and a processor 140. The electronic apparatus 100 may be implemented as apparatuses in various types equipped with a projector or image projection function of projecting an image onto a wall or a projection surface.

The acceleration sensor 110 is a sensor that measures the acceleration of an object or the strength of collision. According to an embodiment, the acceleration sensor 110 may process an output signal, and identify the dynamic force such as the acceleration, the vibration, the collision, etc. of an object. There may be one acceleration sensor 110, but there may also be a plurality of acceleration sensors 110. In case there is one acceleration sensor 110, it may be arranged on a main board on which basic components are mounted, but the disclosure is not limited thereto. In case there are a plurality of acceleration sensors 110, they may be arranged on locations distanced from one another, e.g., a main board, a sub board, a bezel, etc.

The distance sensor 120 is a sensor that measures a distance from the electronic apparatus 100 to an ambient object (or, an obstacle). For example, it may be a Time of Flying (ToF) sensor, etc., and by using the sensor, distance information (or depth information) to an object may be acquired at the same time as acquiring an image of the object, and a reference coordinate system may be set based on the object on the basis of the acquired distance information.

The image projector 130 may perform a function of projecting light for expressing an image to the outside and outputting an image on a projection surface. Here, the projection surface may be a part of a physical space wherein an image is output or a separate projection surface. The image projector 130 may include various detailed components such as at least one light source among a lamp, LEDs, laser, etc., a projection lens, a reflector, etc.

The image projector 130 may project an image by one of various projection methods (e.g., a cathode-ray tube (CRT) method, a liquid crystal display (LCD) method, a digital light processing (DLP) method, a laser method, etc.). The image projector 130 may include at least one light source.

The image projector 130 may output an image in a screen ratio of 4:3, a screen ratio of 5:4, and a wide screen ratio of 16:9 according to the use of the electronic apparatus 100 or the user's setting, etc., and output an image in various resolutions such as WVGA (854*480), SVGA (800*600), XGA (1024*768), WXGA (1280*720), WXGA (1280*800), SXGA (1280*1024), UXGA (1600*1200), Full HD (1920*1080), etc. according to screen ratios.

Also, the image projector 130 may perform various functions for adjusting a projection image by control by the processor 140. For example, the image projector 130 may perform a zoom function, a lens shift function, etc.

The at least one processor 140 (referred to as the processor hereinafter) is electrically connected with the acceleration sensor 110, the distance sensor 120, and the image projector 130, and controls the overall operations of the electronic apparatus 100. The processor 140 may consist of one or a plurality of processors. Specifically, the processor 140 may perform the operations of the electronic apparatus 100 according to the various embodiments of the disclosure by executing at least one instruction stored in a memory (not shown).

According to an embodiment, the processor 140 may be implemented as a digital signal processor (DSP) processing digital image signals, a microprocessor, a graphics processing unit (GPU), an artificial intelligence (AI) processor, a neural processing unit (NPU), and a time controller (TCON). However, the disclosure is not limited thereto, and the processor 140 may include one or more of a central processing unit (CPU), a micro controller unit (MCU), a micro processing unit (MPU), a controller, an application processor (AP) or a communication processor (CP), and an ARM processor, or may be defined by the terms. Also, the processor 140 may be implemented as a system on chip (SoC) having a processing algorithm stored therein or large scale integration (LSI), or implemented in forms of an application specific integrated circuit (ASIC) and a field programmable gate array (FPGA).

According to an embodiment, the processor 140 may control the image projector 130 to project an image onto the projection surface.

According to an embodiment, the processor 140 may acquire distortion information in a vertical direction (or distortion information in an up-down direction) corresponding to a projection image based on slope information of the electronic apparatus 100 acquired by the acceleration sensor and distance information to the projection surface acquired by the distance sensor.

For example, the slope information of the electronic apparatus 100 may include information on a degree that the electronic apparatus 100 is sloped to the bottom surface in a vertical direction, based on the bottom surface supporting the electronic apparatus 100. In this case, the vertical direction may be a direction orthogonal to the bottom surface, and may be an up direction or a down direction.

According to an embodiment, the processor 140 may acquire a coordinate value of a distortion predicted image based on the slope information of the electronic apparatus 100 and the distance information, and acquire distortion information by comparing the acquired coordinate value with a coordinate value of a basic projection image. Here, the basic projection image is a projection image wherein there is no keystone distortion, and it may be acquired based on optical information of the electronic apparatus 100. Here, the optical information may include at least one of magnification information, the focal distance information, the view angle information, or the resolution information of the lens constituting the image projector 130. The focal distance information is information regarding the distance between the central point of the lens and the focus (an object), and the view angle information is information regarding an angle by which the electronic apparatus 100, etc. can contain an image through the lens, and the resolution information is information regarding the number of pixels in horizontal and vertical directions expressed by the screen.

According to an embodiment, the processor 140 may acquire distortion information in the vertical direction by comparing coordinate values corresponding to each vertex (or corner point) of a distortion predicted image with coordinate values corresponding to each vertex of the basic projection image.

For example, the processor 140 may calculate coordinate values corresponding to each vertex of a distortion predicted image which is distorted in the vertical direction based on coordinate values corresponding to each vertex of the basic projection image based on the slope information and the distance information. Then, the processor 140 may acquire the distortion information in the vertical direction based on the difference between the coordinate values corresponding to each vertex of the distortion predicted image and the coordinate values corresponding to each vertex of the basic projection image.

The processor 140 may acquire keystone correction information in the vertical direction based on the distortion information in the vertical direction acquired by the aforementioned method. Here, the keystone correction information may be information regarding a pixel movement value in at least one of the vertical direction (the up-down direction) or the horizontal direction (the left-right direction) of each vertex. However, the disclosure is not limited thereto, and the information may be in a conversion matrix form for correcting each vertex coordinate.

According to an embodiment, if a first user instruction for a keystone correction is received, the processor 140 may acquire keystone correction information in a horizontal direction corresponding to the first user instruction.

Here, the user instruction is an input signal corresponding to a button input by the user through a UI. The horizontal direction means a direction parallel to the bottom surface based on the bottom surface supporting the electronic apparatus 100, and it may be a left direction or a right direction. According to an embodiment, the keystone correction information in the horizontal direction corresponding to the first user instruction may include rotation information in one of the left direction or the right direction.

Here, the UI may be projected together with an image according to an embodiment, but it may be a UI provided from an external apparatus. Also, the UI may be at least one of a four-direction UI (an up-down-left-right direction UI) or a two-direction UI (a left-right direction UI).

According to an embodiment, keystone correction values corresponding to each button of a four-direction UI may be stored in the memory (not shown) in advance. Here, the keystone correction values corresponding to each button may be keystone correction values corresponding to a case wherein each button was selected once. For example, a value of rotation in one degree in the left direction may be stored in the memory (not shown) as the keystone correction value corresponding to the left direction button. When a user instruction is received, the processor 140 may acquire a corresponding keystone correction value from the memory (not shown).

According to an embodiment of the disclosure, if a first user instruction selecting one of the left direction button or the right direction button included in the UI is received, the processor 140 may acquire keystone correction information in the horizontal direction corresponding to the first user instruction.

According to an embodiment, the processor 140 may control the image projector 130 to project a user interface (UI) including buttons in four directions of up, down, left, and right onto the projection image together with an image. In this case, the four-direction buttons may be respectively arranged on the upper side, the lower side, the left side, and the right side of the image, but are not limited thereto, and the respective four-direction buttons may be arranged in adjacent locations in specific locations of the projected image. In this case, the user may select the buttons included in the projected UI by using an external apparatus, etc.

According to another embodiment, if a signal corresponding to the first user instruction selecting one of a left direction button or a right direction button among four-direction buttons provided on an external apparatus (not shown) is received through the communication interface (not shown), the processor 140 may acquire keystone correction information in the horizontal direction corresponding to the first user instruction. According to an embodiment, the external apparatus (not shown) may be a remote control, a user terminal, or a Bluetooth speaker that can recognize voices, etc., but is not limited thereto.

According to an embodiment, if the first user instruction for a keystone correction is received, the processor 140 may perform a keystone correction for an image based on the keystone correction information in the horizontal direction corresponding to the first user instruction and the acquired keystone correction information in the vertical direction.

According to an embodiment, the processor 140 may perform a first keystone correction for an image based on the keystone correction information in the vertical direction, and perform a second keystone correction for the first keystone-corrected image based on the keystone correction information in the horizontal direction corresponding to the first user instruction. According to an embodiment, the processor 140 may perform the first keystone correction for an image based on the keystone correction information in the horizontal direction, and perform the second keystone correction for the first keystone-corrected image based on the keystone correction information in the vertical direction.

For example, the processor 140 may acquire a second keystone-corrected image by performing a rotational correction for a first keystone-corrected image in any one of the left direction or the right direction with the vertical direction as the axis by a predetermined angle based on the keystone correction information in the horizontal direction.

According to an embodiment, the processor 140 may control the image projector 130 to project a keystone-corrected image. According to an embodiment, the processor 140 perform the first keystone correction based on the acquired keystone correction information in the vertical direction, and perform the second keystone correction based on the acquired keystone correction in the horizontal direction, and control the image projector 130 to project the second keystone-corrected image.

According to an embodiment, if a second user instruction for a keystone correction in the horizontal direction is received while a keystone-corrected image is being projected, the processor 140 may perform a subsequent correction for the keystone-corrected image based on the keystone correction information in the horizontal direction corresponding to the second user instruction. According to an embodiment, if the second user instruction for a keystone correction in the horizontal direction is received while a keystone-corrected image is being projected based on the first user input, the processor 140 may perform a subsequent keystone correction for the keystone-corrected image based on the keystone-corrected image and the received second user instruction. According to an embodiment, the processor 140 may control the image projector 130 to project the subsequent keystone-corrected image.

According to an embodiment, the processor 140 may identify a correction amount of the keystone correction in the horizontal direction based on a type of a user input corresponding to the first user instruction, and perform the keystone correction in the horizontal direction based on the identified correction amount. For example, the type of the user input may be determined based on the time that the user pushes a button, and an interval among a plurality of inputs, but is not limited thereto.

According to an embodiment, in case the time that the user pushes a button is smaller than the threshold time, the processor 140 may perform a keystone correction in the horizontal direction as much as a first correction amount, and in case the time that the user pushes a button is greater than or equal to the threshold time, the processor 140 may perform a keystone correction in the horizontal direction as much as a second correction amount bigger than the first correction amount.

Meanwhile, in the aforementioned embodiment, it was described that, if the first user instruction for a keystone correction is received after the keystone correction information in the vertical direction of the electronic apparatus 100 is acquired, a keystone correction is performed for an image based on the keystone correction information in the horizontal direction corresponding to the first user instruction and the acquired keystone correction information in the vertical direction, but the disclosure is not limited thereto.

According to another embodiment, it is obvious that, if a user instruction for a keystone correction is received, the keystone correction information in the horizontal direction is acquired based on the received user instruction, and a keystone correction may be performed for an image based on the acquired keystone correction information in the vertical direction and the keystone correction information in the horizontal direction corresponding to the user instruction. That is, acquisition of the correction information is not necessarily performed sequentially like acquiring the keystone correction information in the horizontal direction, and then acquiring the keystone correction information in the vertical direction according to a user instruction, but the keystone correction information in the horizontal direction and the keystone correction information in the vertical direction may be acquired as a user instruction becomes a trigger. Here, a UI for receiving an input of a user instruction may be a two-direction UI (e.g., a left/right direction UI or an up/down direction UI), but is not limited thereto.

Also, according to another embodiment, as long as the location of the electronic apparatus 100 and the projection angle of the image projector 130 are fixed, the slope information of the electronic apparatus 100 and the distance information to the projection surface may not be changed. In this case, the slope information and the distance information to the projection surface may be stored in the memory (not shown) in advance, and the processor 140 may perform a keystone correction for an image based on the keystone correction information in the vertical direction based on the pre-stored information and the keystone correction information in the horizontal direction corresponding to a user instruction. Obviously, if the posture or the location of the electronic apparatus 100 is changed, the slope information of the electronic apparatus 100 and the distance information to the projection surface may be changed, and in this case, the slope information of the electronic apparatus 100 and the distance information to the projection surface can obviously be changed.

According to the aforementioned various embodiments, as a correction for a keystone distortion in the horizontal direction is performed by reflecting the predicted keystone correction information in the vertical direction, an accurate correction result can be acquired through a four-direction UI, and the correction time is also reduced. Accordingly, the user's satisfaction and convenience are improved.

Figure 3:
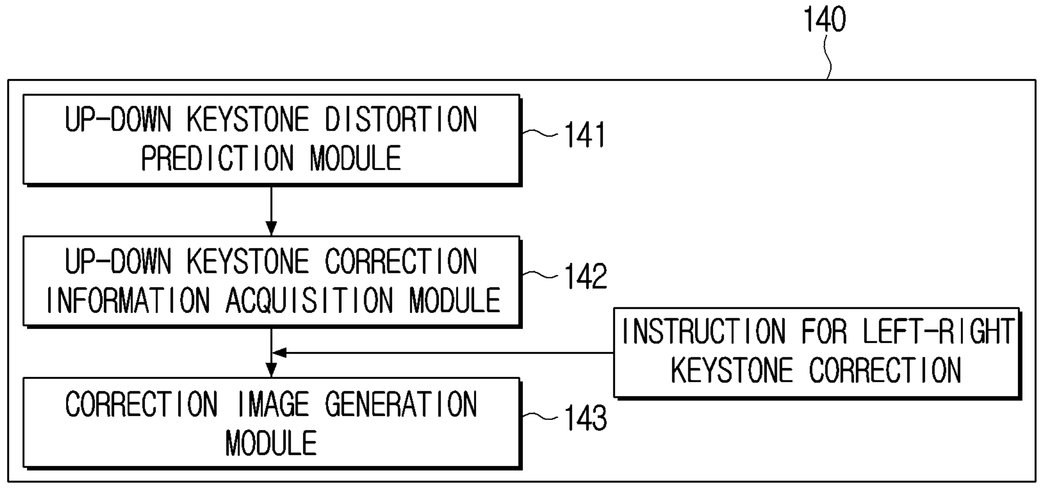
FIG. 3 is a diagram for illustrating a method of generating a keystone correction image according to an embodiment.

FIG. 3 is a diagram for illustrating a method of generating a keystone correction image according to an embodiment.

According to FIG. 3, the processor 140 may acquire up-down keystone distortion information of an image to be projected through an up-down keystone distortion prediction module 141. For example, the processor 140 may predict a keystone distortion of the basic projection image based on information on the up-down rotation angle of the electronic apparatus 100 acquired through the acceleration sensor 110 and information on the distance to the projection surface acquired through the distance sensor 120.

Also, the processor 140 may acquire up-down keystone correction information of an image to be projected through an up-down keystone correction information acquisition module 142. For example, the processor 140 may identify the movement sizes of each vertex of an image for removing the distortion of the image, based on distortion information acquired through the up-down keystone distortion prediction module 141. In this case, the processor 140 may acquire the information on the moving sizes of each vertex based on the coordinate values of each vertex.

Also, the processor 140 may generate a correction image through a correction image generation module 143 based on a left-right keystone correction instruction received from the user. For example, the processor 140 may generate a correction image based on the up-down keystone correction information acquired through the up-down keystone correction information acquisition module 142 and the left-right keystone correction information corresponding to a user correction instruction stored in the memory (not shown) in advance. In this case, the processor 140 may project the correction image by controlling the image projector 130.

Figure 4A:
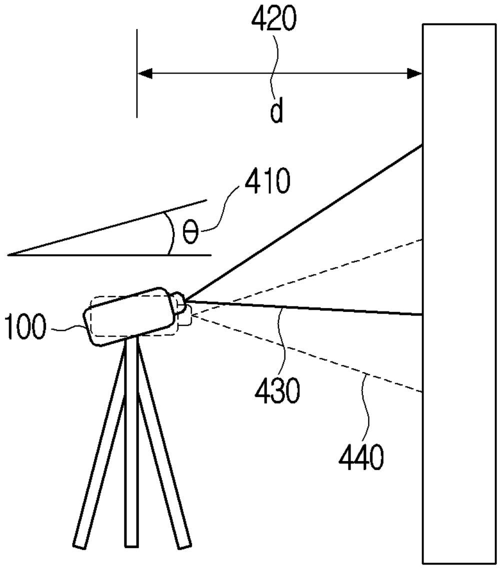
FIG. 4A is a diagram for illustrating a method of acquiring distortion information in a vertical direction according to an embodiment.
Figure 4B:
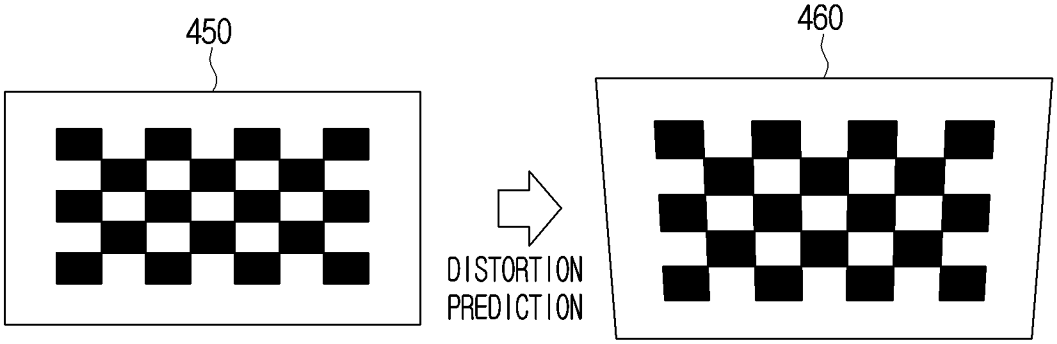
FIG. 4B is a diagram for illustrating a method of acquiring distortion information in a vertical direction according to an embodiment.

FIG. 4A and FIG. 4B are diagrams for illustrating a method of acquiring distortion information in a vertical direction according to an embodiment.

According to FIG. 4A, the processor 140 may acquire distortion information in the vertical direction corresponding to a projection image based on the slope information 410 of the electronic apparatus 100 acquired by the acceleration sensor and the distance information 420 to the projection surface acquired by the distance sensor. According to an embodiment, the processor 140 may acquire a basic projection image 440 based on optical information of the electronic apparatus 100. In this case, the processor 140 may acquire an image 430 wherein a distortion in the vertical direction is predicted in the basic projection image 440 based on the acquired slope information 410 and distance information 420.

According to FIG. 4B, the processor 140 may acquire a distortion predicted image 460 wherein a distortion in the vertical direction is predicted based on the acquired basic projection image 450. In this case, the horizontal direction is not considered, and thus the locations of the corners in the upper and lower parts of the image are as in the basic projection image. According to an embodiment, the processor 140 may acquire distortion information in the vertical direction corresponding to a projection image based on the acquired basic projection image 450 and the distortion predicted image 460 wherein a distortion in the vertical direction is predicted.

Figure 5:
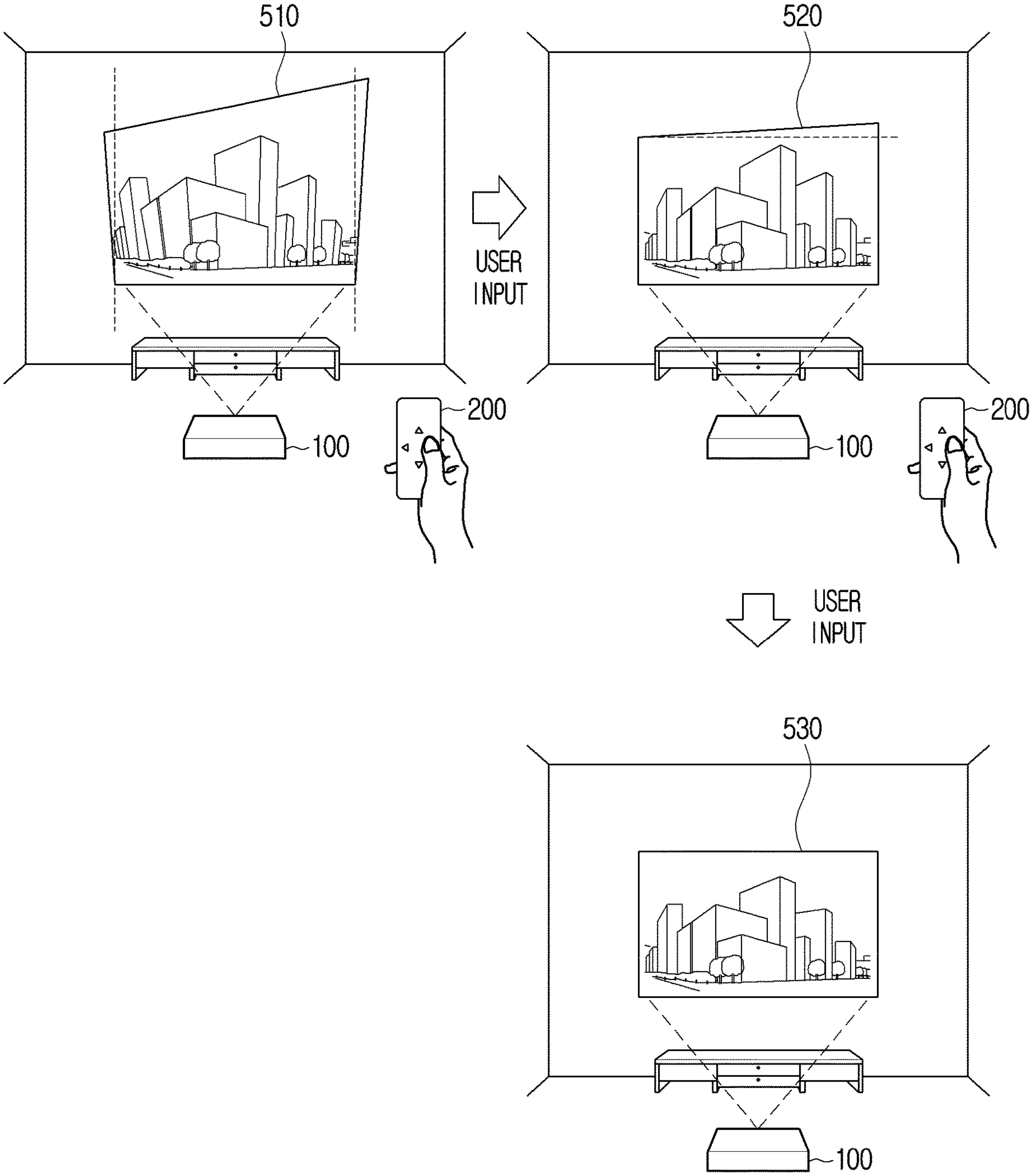
FIG. 5 is a diagram for illustrating a method of performing a keystone correction based on a user instruction according to an embodiment.

FIG. 5 is a diagram for illustrating a method of performing a keystone correction based on a user instruction according to an embodiment.

According to FIG. 5, if a user instruction is received through an external apparatus 200 such as a remote control, etc., the processor 140 may perform a keystone correction for an image based on the keystone correction information in the horizontal direction corresponding to the user instruction and the acquired keystone correction information in the vertical direction, and control the image projector 130 to project the image.

According to an embodiment, if a first user instruction (or input) corresponding to the right direction button is received, the processor 140 may project a keystone-corrected image 520 which is the existing image 510 that has gone through a keystone correction in consideration of the keystone correction information in the horizontal direction corresponding to the user instruction and the predicted keystone correction information in the vertical direction.

According to an embodiment, if a second user instruction (or input) for a keystone correction in the horizontal direction is received while the keystone-corrected image 520 is being projected, the processor 140 may perform a subsequent correction for the keystone-corrected image 520 based on the keystone correction information in the horizontal direction corresponding to the second user instruction, and control the image projector 130 to project the subsequent keystone-corrected image 530. Through the subsequent keystone correction, the user can acquire an image of which correction result is accurate.

Figure 6:
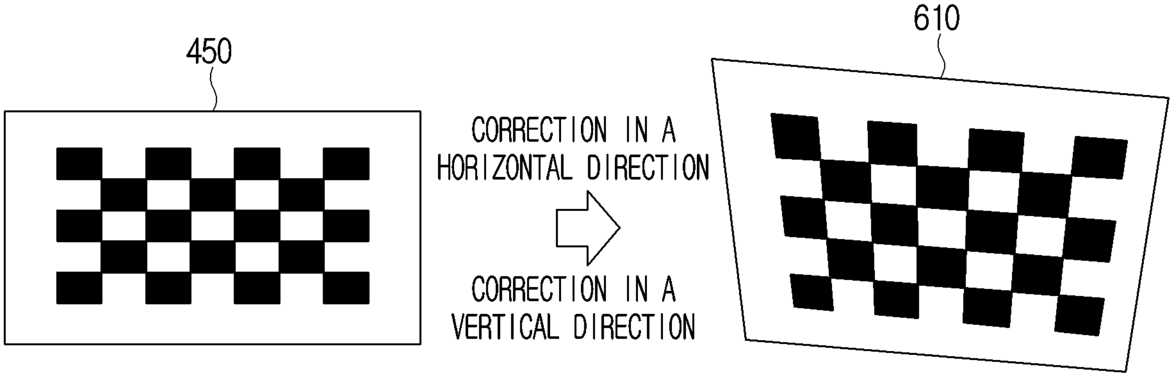
FIG. 6 is a diagram for illustrating a method of performing a keystone correction for an image based on keystone correction information in a horizontal direction and a vertical direction according to an embodiment.

FIG. 6 is a diagram for illustrating a method of performing a keystone correction for an image based on keystone correction information in a horizontal direction and a vertical direction according to an embodiment.

According to FIG. 6, the processor 140 may perform a keystone correction for an image based on keystone correction information in the horizontal direction and keystone correction information in the vertical direction. According to an embodiment, the processor 140 may perform a keystone correction for the basic projection image based on the basic projection image 450, distortion information in the vertical direction, and keystone correction information in the horizontal direction corresponding to a user instruction. In this case, the keystone-corrected image 610 is an image that is before being projected, and in case the image 610 is displayed on the projection surface through the image projector 130, it becomes a form closer to a rectangle than before the correction.

Figure 7A:
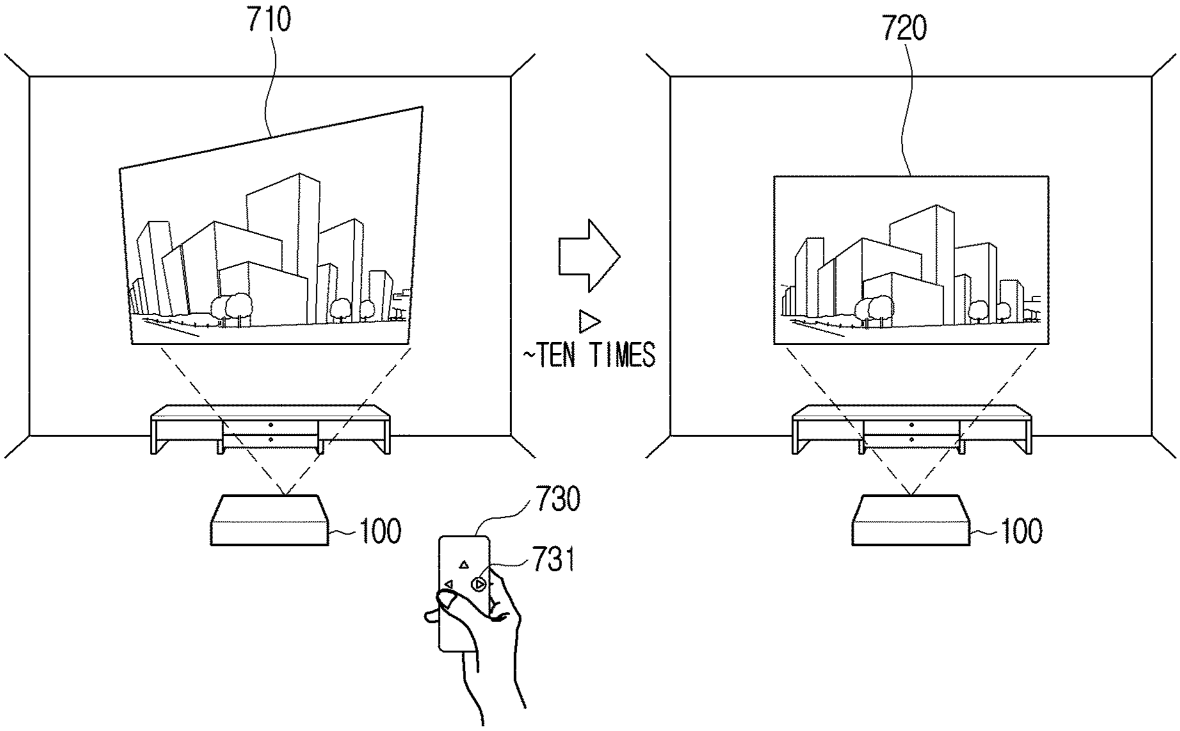
FIG. 7A is a diagram for illustrating a method of generating a keystone correction image according to an embodiment.
Figure 7B:
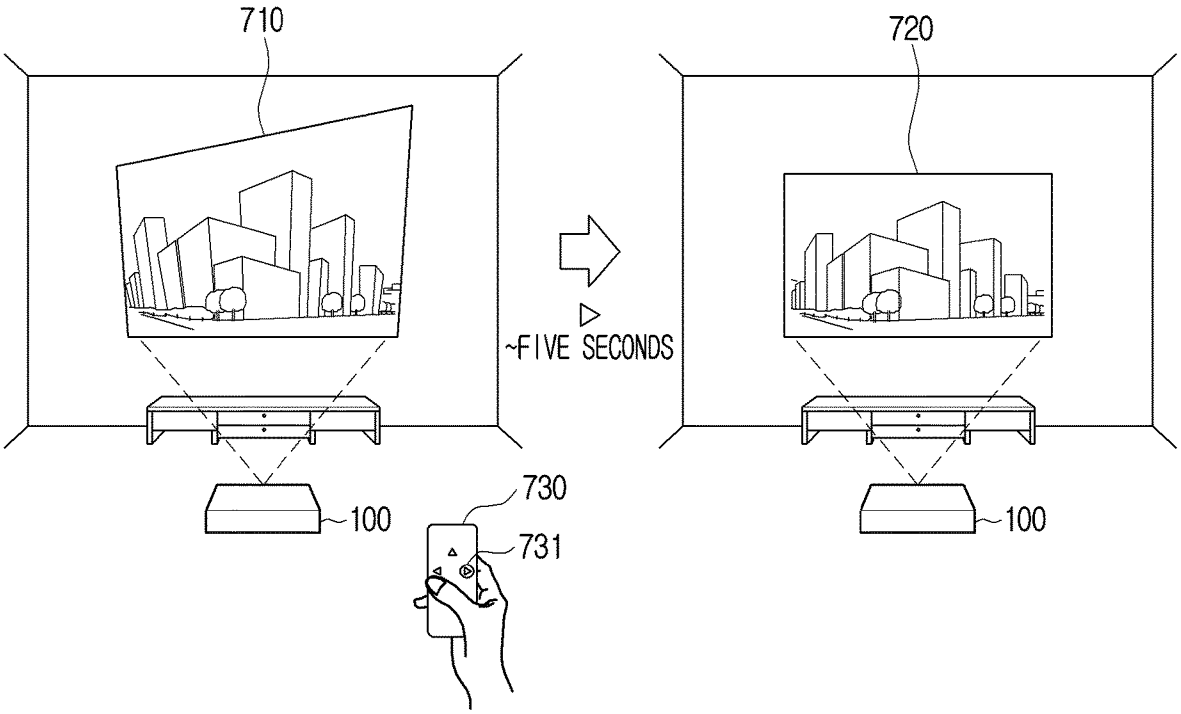
FIG. 7B is a diagram for illustrating a method of generating a keystone correction image according to an embodiment.

FIG. 7A and FIG. 7B are diagrams for illustrating a method of generating a keystone correction image according to an embodiment.

According to FIG. 7A, the processor 140 may perform a subsequent keystone correction for a keystone-corrected image based on keystone correction information in the horizontal direction corresponding to a user instruction. According to an embodiment, if a signal corresponding to a user instruction selecting a right direction button 731 provided on an external apparatus 730 is received through the communication interface (not shown), the processor 140 may perform a keystone correction for an image based on the keystone correction information in the horizontal direction corresponding to the user instruction and the keystone correction information in the vertical direction.

Then, the processor 140 may perform a subsequent keystone correction for the keystone-corrected image based on the keystone correction information in the horizontal direction corresponding to the user instruction. As a subsequent keystone correction is performed repeatedly, the processor 140 may ultimately display a keystone-corrected image 720 wherein there is no distortion on the projection surface.

For example, whenever the user clicks the right direction button 731 of the remote control 730 which is an external apparatus, the image for which a keystone correction in the horizontal direction was performed may be projected, and the user may click the right direction button until the keystone-corrected image becomes an image in a rectangular form.

According to FIG. 7B, the processor 140 may identify a correction amount of a keystone correction in the horizontal direction based on a type of a user input, and perform a keystone correction in the horizontal direction based on the identified correction amount. According to an embodiment, in case a user input corresponding to a user instruction is greater than or equal to the threshold time, the processor 140 may identify the correction amount of the keystone correction in the horizontal direction corresponding to the user input.

For example, in case a user input is greater than or equal to the threshold time, the processor 140 may identify the correction amount of the keystone correction in the horizontal direction corresponding to the user input time, and project a keystone-corrected image as much as the identified correction amount. Alternatively, in case a user input is greater than or equal to the threshold time, the processor 140 may sequentially generate correction images that were corrected as much as a predetermined correction amount, and sequentially project the corrected images in a predetermined time unit.

For example, it will be assumed that the basic input time corresponding to selection of a button of one time is shorter than two seconds, and the correction amount corresponding to the selection of one time is the basic correction amount, and the threshold time is three seconds.

In this case, if it is identified that a user input was input for five seconds, the processor 140 may identify a correction amount that is five times of the basic correction amount as the correction amount of the keystone correction in the horizontal direction, and project an image that was keystone-corrected as much as the identified correction amount.

Alternatively, if it is identified that a user input was input for five seconds, the processor 140 may sequentially generate correction images that were corrected as much as the correction amount corresponding to the basic input time, and sequentially project the corrected images in a time unit of one second.

Figure 8:
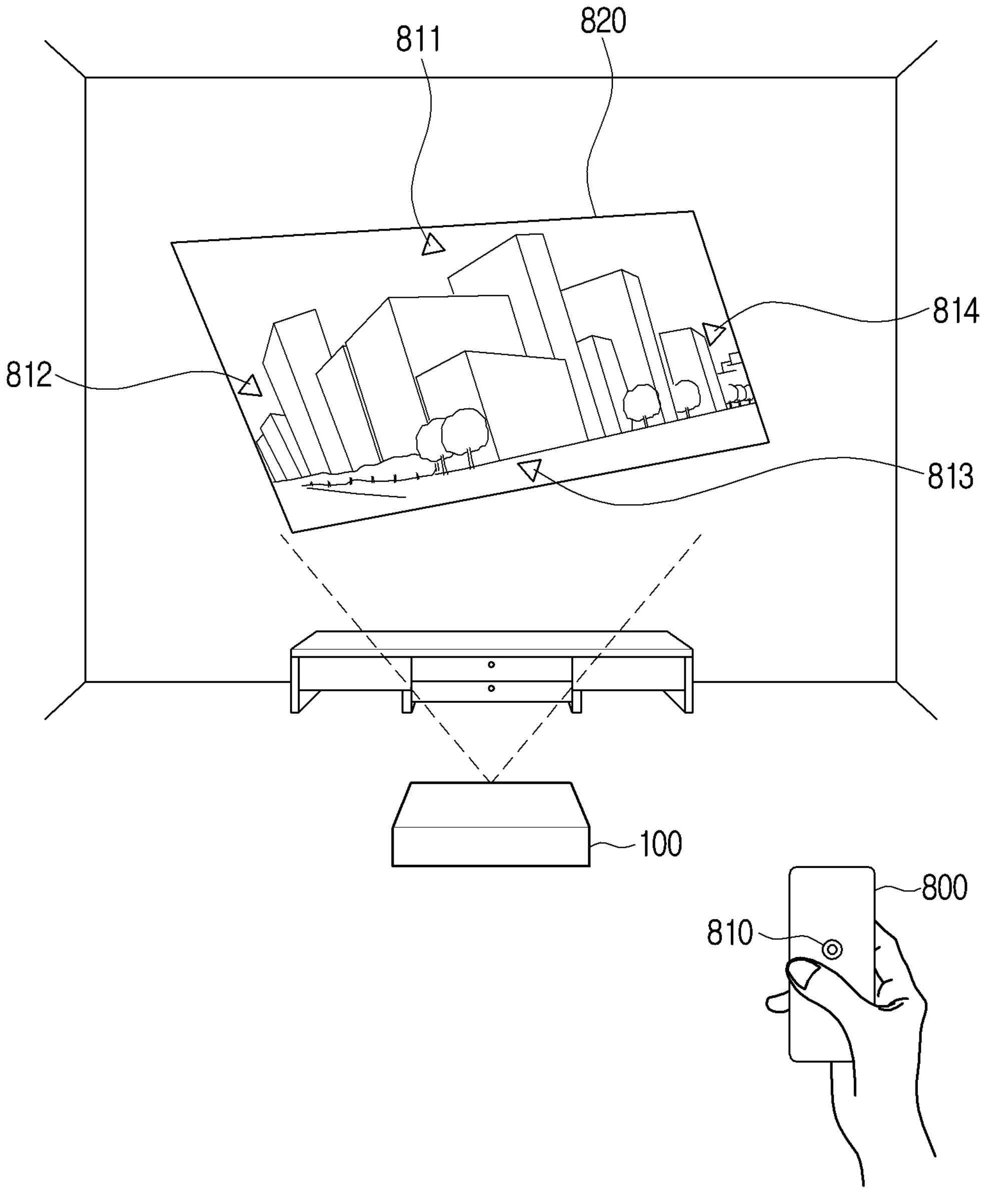
FIG. 8 is a diagram for illustrating a method of controlling an image projector according to an embodiment.

FIG. 8 is a diagram for illustrating a method of controlling an image projector according to an embodiment.

According to FIG. 8, the processor 140 may control the image projector to project a UI including buttons in four directions of up, down, left, and right onto the projection surface. In this case, the four-direction UI and an image may be projected together. According to an embodiment, the processor 140 may control the image projector 130 to project a UI 811 to 814 including four-direction buttons onto the projection surface together with an image 820. According to an embodiment, a user instruction for a keystone correction in a specific direction may be input through manipulation of selecting a specific button 811 on the UI 811 to 814 through a remote control 800 which is an external apparatus.

Figure 9:
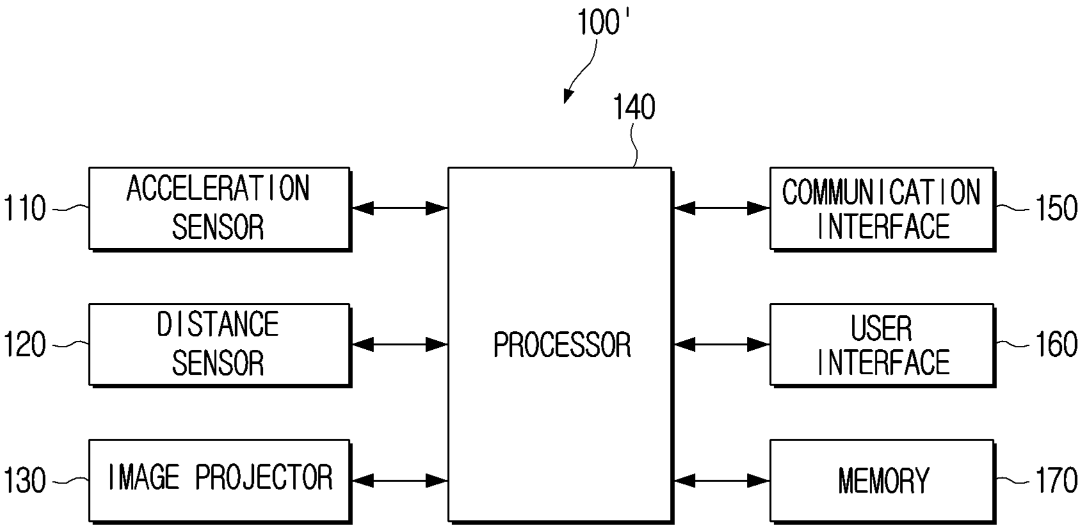
FIG. 9 is a diagram for illustrating a detailed configuration of an electronic apparatus according to an embodiment.

FIG. 9 is a diagram for illustrating a detailed configuration of an electronic apparatus according to an embodiment.

According to FIG. 9, the electronic apparatus 100' includes an acceleration sensor 110, a distance sensor 120, an image projector 130, a processor 140, a communication interface 150, a user interface 160, and a memory 170. Among the components illustrated in FIG. 9, regarding components overlapping with the components illustrated in FIG. 2, detailed explanation will be omitted.

The communication interface 150 can obviously be implemented as various interfaces depending on implementation examples of the electronic apparatus 100'. For example, the communication interface 150 may receive an input image by a streaming or download method from an external apparatus (e.g., a source apparatus), an external storage medium (e.g., a USB memory), an external server (e.g., a webhard), etc. through communication methods such as digital interfaces in various types, Wi-Fi based on AP (Wi-Fi, a wireless LAN network), Bluetooth, Zigbee, a wired/wireless local area network (LAN), a wide area network (WAN), an Ethernet, IEEE 1394, a high-definition multimedia interface (HDMI), a universal serial bus (USB), a mobile high-definition link (MHL), Audio Engineering Society/European Broadcasting Union (AES/EBU), Optical, Coaxial, etc.

The user interface 160 may be implemented as a device such as a button, a touch pad, a mouse, and a keyboard, or implemented as a touch screen, a remote control transceiver, etc. that can perform the aforementioned display function and a manipulation input function together. The remote control transceiver may receive a remote control signal or transmit a remote control signal from or to an external remote control apparatus through at least one communication method among infrared communication, Bluetooth communication, or Wi-Fi communication.

The memory 170 may store data necessary for various embodiments of the disclosure. The memory 170 may be implemented in the form of a memory embedded in the electronic apparatus 100', or implemented in the form of a memory that can be attached to or detached from the electronic apparatus 100', according to the usage of stored data. For example, in the case of data for operating the electronic apparatus 100', the data may be stored in a memory embedded in the electronic apparatus 100', and in the case of data for an extended function of the electronic apparatus 100', the data may be stored in a memory that can be attached to or detached from the electronic apparatus 100'. Meanwhile, in the case of a memory embedded in the electronic apparatus 100', the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). Also, in the case of a memory that can be attached to or detached from the electronic apparatus 100', the memory may be implemented in a form such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

Figure 10:
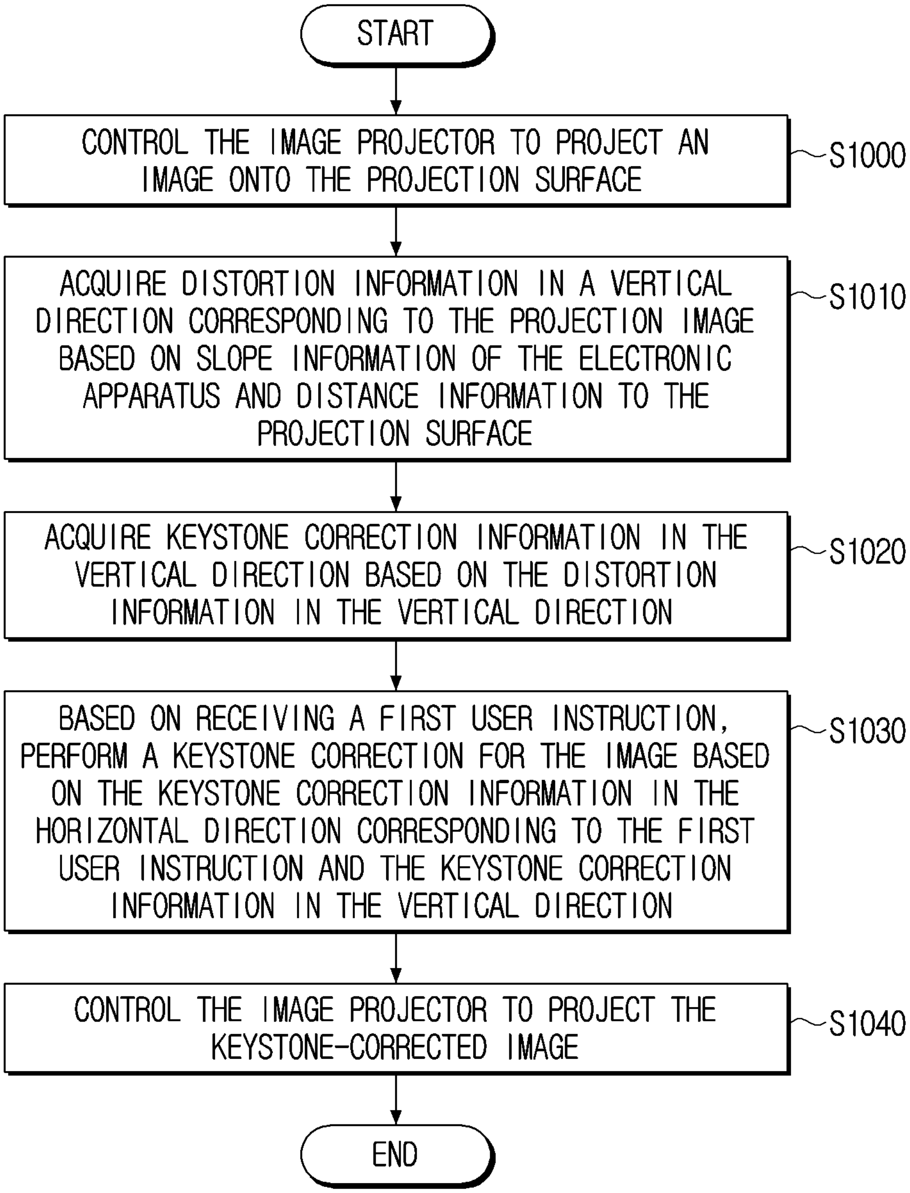
FIG. 10 is a flow chart for illustrating a control method of an electronic apparatus according to an embodiment.

FIG. 10 is a flow chart for illustrating a control method of an electronic apparatus according to an embodiment.

According to a control method of an electronic apparatus illustrated in FIG. 10, first, an image is projected onto a projection surface in operation S1000.

Then, distortion information in a vertical direction corresponding to the projection image is acquired based on slope information of the electronic apparatus and distance information to the projection surface in operation S1010.

Afterwards, keystone correction information in the vertical direction is acquired based on the distortion information in the vertical direction in operation S1020.

Then, if a first user instruction is received, a keystone correction is performed for the image based on keystone correction information in a horizontal direction corresponding to the first user instruction and the keystone correction information in the vertical direction in operation S1030.

Then, the keystone-corrected image is projected in operation S1040.

Also, in the operation S1000, a UI including buttons in four directions of up, down, left, and right may be projected onto the projection surface.

In addition, the operation S1010 may include the steps of predicting a basic projection image of the image on the projection surface based on optical information of the electronic apparatus, and acquiring distortion information in a vertical direction for the basic projection image based on the slope information of the electronic apparatus and the distance information to the projection surface.

Further, the operation S1020 may include the steps of performing a first keystone correction for the image based on the keystone correction information in the vertical direction, performing a second keystone correction for the first keystone-corrected image based on the keystone correction information in the horizontal direction corresponding to the first user instruction, and projecting the second keystone-corrected image.

Also, in the operation S1020, the second keystone-corrected image may be acquired by performing a rotational correction for the first keystone-corrected image in any one of the left direction or the right direction with the vertical direction as the axis by a predetermined angle based on the keystone correction information in the horizontal direction.

In addition, in the operation S1020, if the first user instruction selecting one of a left direction button or a right direction button included in the UI is received, the keystone correction information in the horizontal direction corresponding to the first user instruction may be acquired.

Further, in the operation S1020, if a signal corresponding to the first user instruction selecting one of a left direction button or a right direction button among buttons in four directions provided on an external apparatus is received through the communication interface, the keystone correction information in the horizontal direction corresponding to the first user instruction may be acquired.

Also, in the operation S1020, a correction amount of the keystone correction in the horizontal direction may be identified based on a type of a user input corresponding to the first user instruction, and the keystone correction in the horizontal direction may be performed based on the identified correction amount.

In addition, in the operation S1030, the keystone correction information in the vertical direction may be acquired based on the distortion information in the vertical direction for the basic projection image.

Further, the control method may further include the steps of, based on receiving a second user instruction for the keystone correction in the horizontal direction while the keystone-corrected image is being projected, performing a subsequent keystone correction for the keystone-corrected image based on the keystone correction information in the horizontal direction corresponding to the second user instruction, and projecting the subsequent keystone-corrected image.

According to the aforementioned various embodiments, as a correction for a keystone distortion in the horizontal direction is performed by reflecting the predicted keystone correction information in the vertical direction, an accurate correction result can be acquired through a four-direction UI, and the correction time is also reduced. Accordingly, the user's satisfaction and convenience are improved.

Meanwhile, methods according to the aforementioned various embodiments of the disclosure may be implemented in forms of applications that can be installed on conventional electronic apparatuses. Alternatively, the methods according to the aforementioned various embodiments of the disclosure may be performed by using an artificial intelligence neural network based on deep learning (or a deep artificial neural network), i.e., a learning network model.

Also, the methods according to the aforementioned various embodiments of the disclosure may be implemented just with software upgrade, or hardware upgrade of conventional electronic apparatuses.

In addition, the aforementioned various embodiments of the disclosure may be performed through an embedded server provided on an electronic apparatus, or an external server of an electronic apparatus.

Meanwhile, according to an embodiment of the disclosure, the aforementioned various embodiments may be implemented as software including instructions stored in machine-readable storage media, which can be read by machines (e.g.: computers). The machines refer to apparatuses that call instructions stored in a storage medium, and can operate according to the called instructions, and the apparatuses may include an electronic apparatus according to the aforementioned embodiments (e.g.: an electronic apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, the methods according to the aforementioned various embodiments may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components according to the aforementioned various embodiments (e.g.: a module or a program) may consist of a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform the functions that were performed by each of the components before integration identically or in a similar manner. A module, a program, or operations performed by other components according to the various embodiments may be executed sequentially, in parallel, repetitively, or heuristically. Or, at least some of the operations may be executed in a different order or omitted, or other operations may be added.

Further, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus comprising:
an acceleration sensor;
a distance sensor;
an image projector; and
at least one processor configured to:
control the image projector to project an image onto a projection surface, to provide a projection image on the projection surface,
predict a basic projection image of the image on the projection surface based on optical information of the electronic apparatus,
acquire distortion information in a vertical direction for the basic projection image based on slope information of the electronic apparatus acquired by the acceleration sensor and distance information to the projection surface acquired by the distance sensor,
acquire keystone correction information in the vertical direction based on the distortion information in the vertical direction,
based on receiving a first user instruction for a keystone correction, perform a keystone correction for the image to provide a keystone-corrected image based on keystone correction information in a horizontal direction corresponding to the first user instruction and the keystone correction information in the vertical direction, and
control the image projector to project the keystone-corrected image.

2. The electronic apparatus of claim 1, wherein the at least one processor is configured to:
perform a first keystone correction for the image based on the keystone correction information in the vertical direction, to provide a first keystone-corrected image,
perform a second keystone correction for the first keystone-corrected image based on the keystone correction information in the horizontal direction corresponding to the first user instruction, to provide a second keystone-corrected image, and
control the image projector to project the second keystone-corrected image.

3. The electronic apparatus of claim 2, wherein
the keystone correction information in the horizontal direction corresponding to the first user instruction comprises rotation information in one of a left direction or a right direction, and
the at least one processor is configured to:
acquire the second keystone-corrected image by performing a rotational correction for the first keystone-corrected image in any one of the left direction or the right direction with the vertical direction as an axis by a predetermined angle based on the keystone correction information in the horizontal direction.

4. The electronic apparatus of claim 1, wherein the at least one processor is configured to:
based on receiving a second user instruction for the keystone correction while the keystone-corrected image is being projected, perform a subsequent keystone correction for the keystone-corrected image based on the keystone correction information in the horizontal direction corresponding to the second user instruction, to provide a subsequent keystone-corrected image, and
control the image projector to project the subsequent keystone-corrected image.

5. The electronic apparatus of claim 1, wherein the at least one processor is configured to:
control the image projector to project a UI comprising buttons in four directions of up, down, left, and right onto the projection surface, and
based on receiving the first user instruction selecting one of a left direction button or a right direction button comprised in the UI, acquire the keystone correction information in the horizontal direction corresponding to the first user instruction.

6. The electronic apparatus of claim 1, further comprising:
a communication interface,
wherein the at least one processor is configured to:
based on receiving a signal corresponding to the first user instruction selecting one of a left direction button or a right direction button among buttons in four directions provided on an external apparatus through the communication interface, acquire the keystone correction information in the horizontal direction corresponding to the first user instruction.

7. The electronic apparatus of claim 1, wherein the at least one processor is configured to:
identify a correction amount of the keystone correction in the horizontal direction based on a type of a user input corresponding to the first user instruction, and perform the keystone correction in the horizontal direction based on the correction amount.

8. A control method of an electronic apparatus, the control method comprising:
projecting an image onto a projection surface to provide a projection image on the projection surface;
predict a basic projection image of the image on the projection surface based on optical information of the electronic apparatus;
acquiring distortion information in a vertical direction for the basic projection image based on slope information of the electronic apparatus acquired by an acceleration sensor and distance information to the projection surface acquired by a distance sensor;
acquiring keystone correction information in the vertical direction based on the distortion information in the vertical direction;
based on receiving a first user instruction for a keystone correction, performing a keystone correction for the image to provide a keystone-corrected image based on keystone correction information in a horizontal direction corresponding to the first user instruction and the keystone correction information in the vertical direction; and
projecting the keystone-corrected image.

9. The control method of claim 8, wherein the performing the keystone correction for the image comprises:
performing a first keystone correction for the image based on the keystone correction information in the vertical direction, to provide a first keystone-corrected image;
performing a second keystone correction for the first keystone-corrected image based on the keystone correction information in the horizontal direction corresponding to the first user instruction, to provide a second keystone-corrected image; and
projecting the second keystone-corrected image.

10. The control method of claim 9, wherein
the keystone correction information in the horizontal direction corresponding to the first user instruction comprises rotation information in one of a left direction or a right direction, and
the performing the second keystone correction comprises:
acquiring the second keystone-corrected image by performing a rotational correction for the first keystone-corrected image in any one of the left direction or the right direction with the vertical direction as an axis by a predetermined angle based on the keystone correction information in the horizontal direction.

11. The control method of claim 8, further comprising:
based on receiving a second user instruction for the keystone correction while the keystone-corrected image is being projected, performing a subsequent keystone correction for the keystone-corrected image based on the keystone correction information in the horizontal direction corresponding to the second user instruction, to provide a subsequent keystone-corrected image; and
projecting the subsequent keystone-corrected image.

12. The control method of claim 8, further comprising:
projecting a UI comprising buttons in four directions of up, down, left, and right onto the projection surface, and
wherein the performing the keystone correction for the image comprises:
based on receiving the first user instruction selecting one of a left direction button or a right direction button comprised in the UI, acquiring the keystone correction information in the horizontal direction corresponding to the first user instruction.

13. A non-transitory computer readable recording medium storing computer instructions to cause an electronic apparatus to perform operations when the computer instructions are executed by a processor of the electronic apparatus, the operations comprising:
projecting an image onto a projection surface to provide a projection image on the projection surface;
predicting a basic projection image of the image on the projection surface based on optical information of the electronic apparatus;
acquiring distortion information in a vertical direction for the basic projection image based on slope information of the electronic apparatus acquired by an acceleration sensor and distance information to the projection surface acquired by a distance sensor;
acquiring keystone correction information in the vertical direction based on the distortion information in the vertical direction;
based on receiving a first user instruction for a keystone correction, performing a keystone correction for the image to provide a keystone-corrected image based on keystone correction information in a horizontal direction corresponding to the first user instruction and the keystone correction information in the vertical direction; and
projecting the keystone-corrected image.

* * * * *